(12) United States Patent
McKay

(10) Patent No.: US 7,619,611 B2
(45) Date of Patent: Nov. 17, 2009

(54) MOBILE COMMUNICATIONS TERMINAL AND METHOD THEREFOR

(75) Inventor: Michael McKay, Frederiksberg (DK)

(73) Assignee: Nokia Corporation, Espoo (FI)

( * ) Notice: Subject to any disclaimer, the term of this patent is extended or adjusted under 35 U.S.C. 154(b) by 836 days.

(21) Appl. No.: 11/170,714

(22) Filed: Jun. 29, 2005

(65) Prior Publication Data

US 2007/0026901 A1 Feb. 1, 2007

(51) Int. Cl.
*G09G 5/00* (2006.01)
*H04M 1/00* (2006.01)
*H04B 1/38* (2006.01)

(52) U.S. Cl. ...................... 345/156; 455/566

(58) Field of Classification Search ......... 345/156–181; 710/1–74; 455/566
See application file for complete search history.

(56) References Cited

U.S. PATENT DOCUMENTS 6,549,792 B1  4/2003  Cannon et al. ............... 455/575
7,194,816 B2 *  3/2007  Tamura .................... 33/355 R

* cited by examiner

*Primary Examiner*—Srilakshmi K Kumar
(74) *Attorney, Agent, or Firm*—Perman & Green LLP

(57) ABSTRACT

A method for adapting viewing of information on a display of a mobile communication apparatus, and a such mobile communication apparatus is disclosed. The invention relates to determining a movement pattern of the mobile communication apparatus; selecting a viewing mode among a plurality of viewing modes in dependence on the determined movement pattern; and viewing items on the display in accordance to the viewing mode.

11 Claims, 2 Drawing Sheets

MOBILE COMMUNICATIONS TERMINAL AND METHOD THEREFOR

TECHNICAL FIELD

The present invention relates to a mobile communication apparatus, and a method for adapting viewing of information on a display.

BACKGROUND OF THE INVENTION

When using a mobile communication apparatus, such as a mobile phone, a smartphone, a personal digital assistant, etc., the limited display area always form constraints for showing information on the display. Further, a mobile communication apparatus is used in various conditions and while performing different actions, such as walking, driving a car, travelling, being at office, etc. Normally, a user is able to set different viewing modes by changing the settings of the mobile communication apparatus, and there are examples on mobile communication apparatuses that automatically change viewing mode depending on attached accessories, e.g. car handsfree equipment. However, there is a need for considering an intuitive concept for displaying items on a display of a mobile communication apparatus to provide information to a user such that a user can perceive it.

SUMMARY OF THE INVENTION

In view of the above, an objective of the invention is to solve or at least reduce the problems discussed above. In particular, an objective is to adapt viewing of information on a display of a mobile communication apparatus to a user in any situation.

The present invention is based on the understanding that a user requires different viewing modes in different situations of use of a mobile communication apparatus, and that an intuitive way of controlling the viewing modes is by detecting movements of the mobile communication apparatus.

According to a first aspect of the present invention there is provided a mobile communication apparatus comprising a processor, a movement sensor connected to the processor, and a user interface controlled by the processor. The movement sensor is arranged to determine a movement pattern of the apparatus, in conjunction with the processor. The user interface comprises a display, which comprises a plurality of viewing modes for displaying items. The processor is arranged to select one of said modes depending on the determined movement pattern.

An advantage of this is that a feasible viewing of items on the display can be achieved without navigating through menus etc.

A first viewing mode may comprise displaying the items larger, and a second mode may comprise displaying the items smaller.

An advantage of this is that the user either will be able to see the items, e.g. text, symbols, icons, images, etc., in large viewing to be able to see them very quickly or at some distance, e.g. when driving a car or while running, or be able to see the items in small viewing, and thus be able to fit in more information on the display, e.g. when in office or sitting on a café.

The first viewing mode may be associated with a movement pattern comprising a high level of movement, and the second viewing mode may be associated with a movement pattern comprising a low level of movement.

An advantage of this is that the mobile communication apparatus can change viewing mode automatically depending on the level of movement, e.g. while running, the mobile communication apparatus is exposed to a high level of movement, and the user will be able to see the items in large viewing, and while sitting on a café, the mobile communication apparatus is exposed to a low level of movement, and the user will be able to see the items in small viewing, thus enabling more information on the display. The user can also "zoom" by shaking the apparatus to get larger viewing of the items.

The first viewing mode may be associated with a movement pattern comprising a first sequence of movements, and the second viewing mode may be associated with a movement pattern comprising a second sequence of movements.

An advantage of this is that the mobile communication apparatus can change viewing mode depending on how the user moves the apparatus, e.g. the user shakes the apparatus twice, and the user will be able to see the items in large viewing, and the user shakes the apparatus once, and the user will be able to see the items in small viewing, thus enabling more information on the display. Thus, the user can "zoom" by shaking the apparatus in a predetermined way to get smaller or larger viewing of the items.

A first movement pattern may comprise movements in a first directions, and a second movement pattern may comprise movements in a second direction. A first movement pattern may comprise repeated movements, and a second movement pattern may comprise a single movement.

The movement sensor may form part of the user interface. The movement sensor may comprise a first electrode and a second electrode, wherein the first electrode is rigid and the second electrode is flexible and arranged in the vicinity of the first electrode, such that when said sensor is exposed to a movement, the first and second electrodes will be in contact at least momentarily. The movement sensor may be arranged to discriminate movements in different directions.

According to a second aspect of the present invention there is provided a method for adapting viewing of information on a display of a mobile communication apparatus, comprising the steps of determining a movement pattern of the mobile communication apparatus; selecting a viewing mode among a plurality of viewing modes in dependence on the determined movement pattern; and viewing items on the display in accordance with the viewing mode.

The advantages of the second aspect of the present invention are similar to those of the first aspect of the present invention.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figures 1, 2A, 2B:
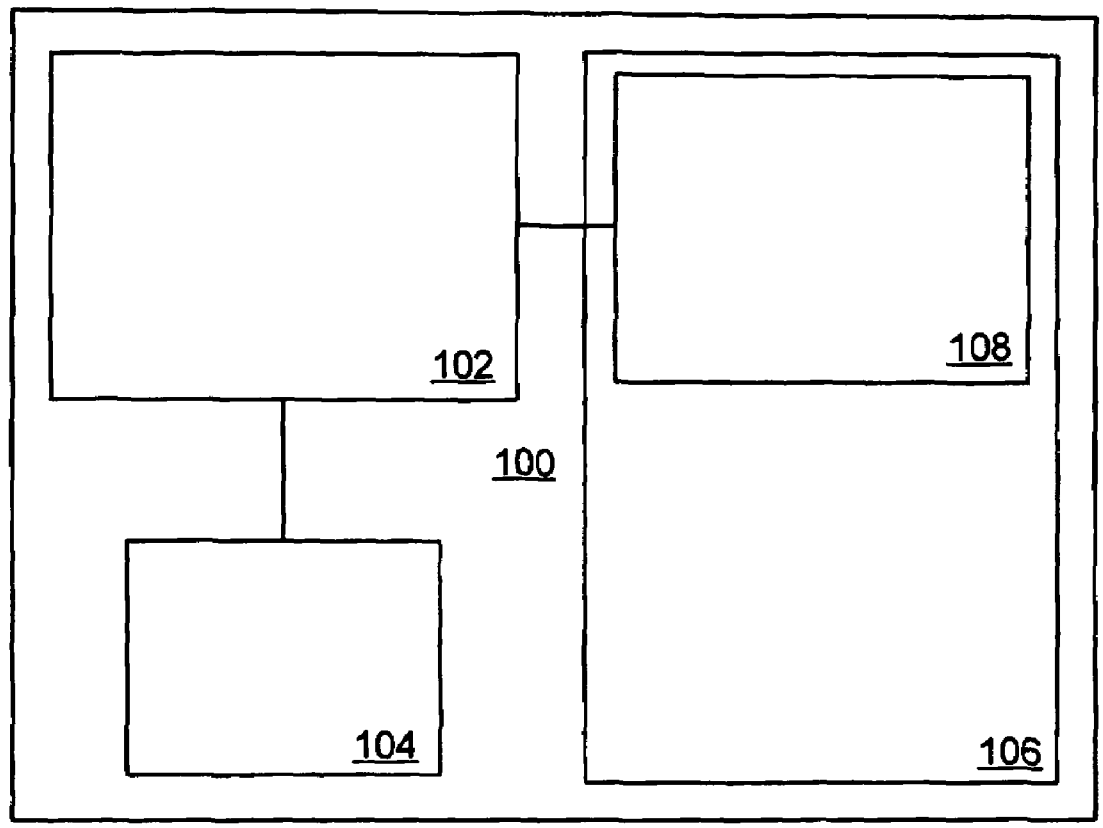
FIG. 1 is a schematic block diagram of a mobile communication apparatus according to an embodiment of the present invention.
FIGS. 2a and 2b illustrate an example where different viewing modes are applied to the display.

FIG. 1 is a schematic block diagram of a mobile communication apparatus 100 according to an embodiment of the present invention. The mobile communication apparatus comprises a processor 102, a movement sensor 104 connected to the processor 102, and a user interface 106. The user interface 106 comprises a display 108, and the user interface 106 with its display 108 are connected to and controlled by the processor 102. The processor is arranged to perform, in conjunction with the user interface 104 and a transceiver (not shown), a plurality of functions, which are normally performed in a mobile communication apparatus. However, to not obstruct the special features of the present invention, description of these normally performed functions are omitted in this disclosure.

The movement sensor 104 is arranged to sense movements which the mobile communication apparatus 100 is exposed to. The processor 102 receives and processes signals from the movement sensor 104 and determines movement patterns from the signal. From the determined movement patterns, the processor 102 selects one of a plurality of viewing modes for the display 108. The movement sensor 104 is here depicted as a separate element. However, functionally, the movement sensor 104 can be considered to be comprised in the user interface 106.

For example, a first viewing mode can comprise displaying items e.g. text, symbols, icons, images, etc. larger, and a second mode may comprise displaying the items smaller, to enable a user to se them very quickly or at some distance, e.g. when driving a car or while running, or be able to se the items in small viewing, and thus be able to fit in more information on the display 108, e.g. when in office or sitting on a café. The first viewing mode can be associated with a movement pattern comprising a high level of movement, and the second viewing mode can be associated with a movement pattern comprising a low level of movement. Thus, the mobile communication apparatus 100 can change viewing mode automatically depending on the level of movement, e.g. while running, the mobile communication apparatus 100 is exposed to a high level of movement, and the user will be able to see the items in large viewing, and while sitting on a café, the mobile communication apparatus 100 is exposed to a low level of movement, and the user will be able to see the items in small viewing, thus enabling more information on the display 108. The user can also "zoom" by shaking the apparatus 100 to get larger viewing of the items.

According to an embodiment of the present invention the first viewing mode is associated with a movement pattern comprising a first sequence of movements, and the second viewing mode is associated with a movement pattern comprising a second sequence of movements. Thus, the mobile communication apparatus 100 can change viewing mode depending on how the user moves the apparatus 100, e.g. the user shakes the apparatus 100 twice, and the user will be able to see the items in large viewing, and the user shakes the apparatus 100 once, and the user will be able to see the items in small viewing, thus enabling more information on the display. Thus, the user can "zoom" by shaking the apparatus in a predetermined way to get smaller or larger viewing of the items. An alternative to this is to move the apparatus 100 in different directions for increasing or decreasing the size of the items. Thus, a first movement pattern can comprise movements in a first direction, and a second movement pattern may comprise movements in a second direction. Further, a first movement pattern can comprise repeated movements, and a second movement pattern may comprise a single movement.

Alternatively, the user can "zoom" by shaking the apparatus 100, or any other movement pattern, such as a continuous movement, to get larger viewing of the items, and then zoom out by menu selection or other command, e.g. voice, buttons, rotating dial, etc., to provide a feasible control in situations where vibrations are present, e.g. driving on a bumpy road, and normal control under normal conditions. This will make the two commands and their corresponding modes positively distinct.

FIGS. 2a and 2b illustrate an example of display views where different viewing modes are applied to the display, where FIG. 2a illustrates items in larger view, here the text font is larger, and FIG. 2b illustrates items in smaller view, here the text font is smaller. The same principle applies to symbols, icons, images, etc.

Figures 3A, 3B:
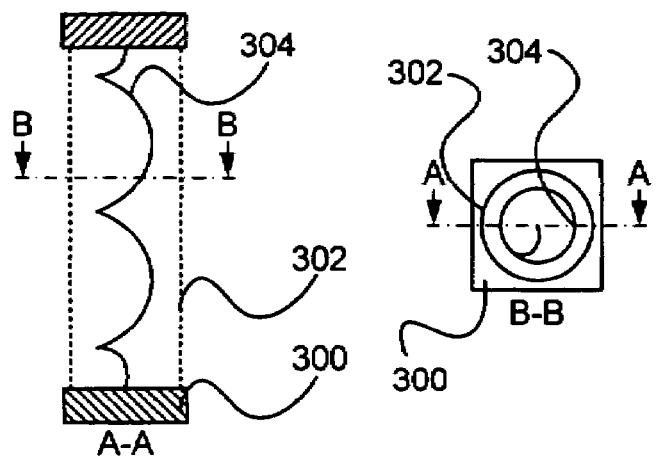
FIGS. 3a and 3b show a movement sensor according to an embodiment of the present invention.

FIGS. 3a and 3b are different views in section of a movement sensor 300 according to an embodiment of the present invention. FIG. 3a is a view in section along line A-A of FIG. 3b, and FIG. 3b is a view in section along line B-B of FIG. 3a. The movement sensor 300 comprises a first electrode 302 forming a cylinder encircling a second electrode 304 forming a flexible coil inside the cylindrical first electrode 302. Other shapes of the electrodes 302, 304 are equally possible, as long as the principle that movements of the sensor 300 will cause one or both of the electrodes to move towards each other at least momentarily.

Figures 4A, 4B:
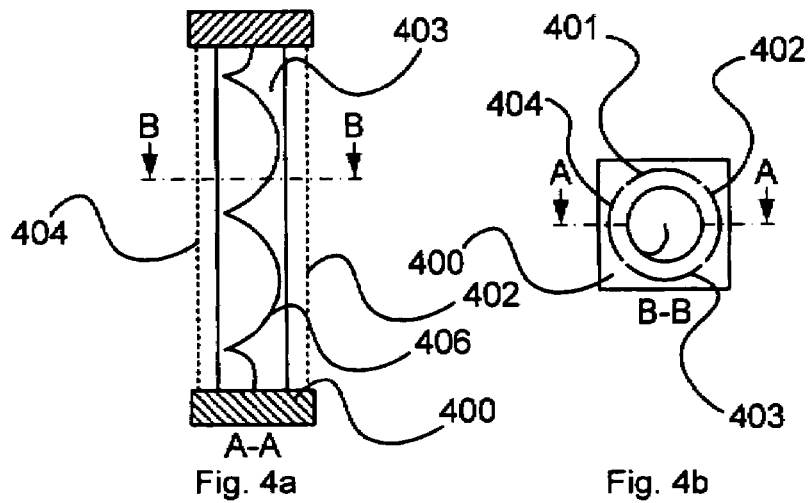
FIGS. 4a and 4b show a movement sensor according to an embodiment of the present invention.

FIGS. 4a and 4b are different views in section of a movement sensor 400 according to an embodiment of the present invention. FIG. 4a is a view in section along line A-A of FIG. 4b, and FIG. 4b is a view in section along line B-B of FIG. 4a. The movement sensor 400 comprises a first set of electrodes comprising electrodes 401, 402, 403, 404 forming a cylinder encircling a second electrode 406 forming a flexible coil inside the cylindrical first set of electrodes. Other shapes of the electrodes 401, 402, 403, 404 are equally possible, as long as the principle that movements of the sensor 400 will cause the second electrode 406 to move towards any of the electrodes 401, 402, 403, 404 at least momentarily. By determining which of the electrodes 401, 402, 403, 404 of the first electrode set being in momentarily contact with the second electrode 406, a direction of the movement can be determined. Here, four electrodes 401, 402, 403, 404 are present, but the number of electrodes can be any number according to the demand of preciseness of direction determination. Further, the electrodes can be grouped such that electrodes facing each other are grouped in pairs, since the second electrode will swing back and forth between these during a movement.

Thus, electrode 401 and 403 can be grouped into one pair, electrically forming one electrode, and electrode 402 and 404 can be grouped into another pair, electrically forming another electrode.

Figure 5:
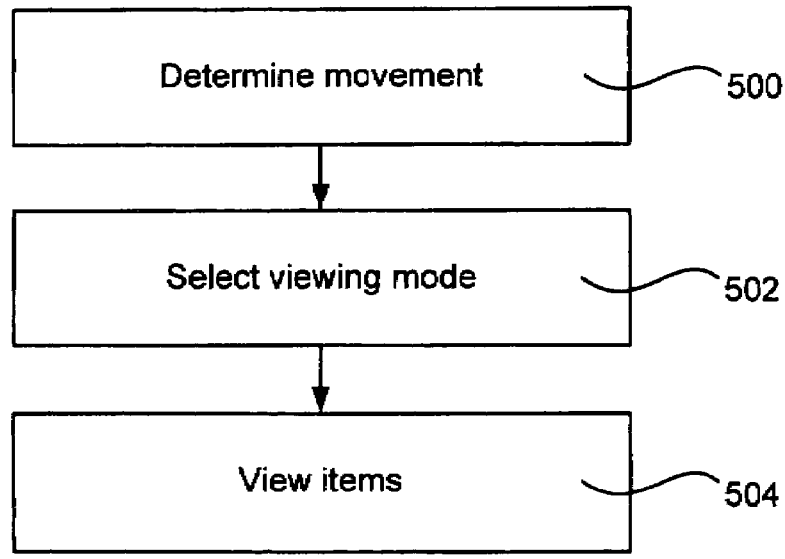
FIG. 5 is a flow chart of a method according to an embodiment of the present invention.

FIG. 5 is a flow chart of a method for adapting viewing of information on a display of a mobile communication apparatus according to an embodiment of the present invention. In a movement determination step 500, a movement pattern of the mobile communication apparatus is determined. In a viewing mode selection step 502, a viewing mode is selected among a plurality of viewing modes in dependence on the determined movement pattern. In an item viewing step 504, items are viewed on the display in accordance with the selected viewing mode.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile communication apparatus comprising:
   a processor, a movement sensor connected to said processor, and a user interface controlled by said processor, wherein said movement sensor is configured, in conjunction with said processor, to determine a movement pattern of said apparatus;
   wherein said user interface comprises a display; and
   said display comprises a plurality of viewing modes for displaying items, wherein said processor is configured to select one of said viewing modes depending on said determined movement pattern; and
   further wherein a first mode for displaying items comprises displaying said items larger, and a second mode for displaying items comprises displaying said items smaller, said first mode being associated with a movement pattern comprising a higher level of movement, and said second mode being associated with a lower level of movement.

2. The mobile communication apparatus according to claim 1, wherein the processor is further configured to cause the apparatus to automatically change a viewing mode for displaying items based on a detected level of movement in the first mode or the second mode.

3. The mobile communication apparatus according to claim 1, wherein said first mode is associated with a movement pattern comprising a first sequence of movements, and said second mode is associated with a movement pattern comprising a second sequence of movements.

4. The mobile communication apparatus according to claim 1, wherein said movement sensor comprises a first electrode and a second electrode, wherein said first electrode is rigid and said second electrode is arranged in vicinity of said first electrode and being flexible, such that when said sensor is exposed to a movement, said first and second electrodes will be in contact at least momentarily.

5. The mobile communication apparatus according to claim 1, wherein said user interface comprises said movement sensor.

6. The mobile communication apparatus according to claim 1, wherein said movement sensor is arranged to discriminate movements in different directions.

7. The mobile communication apparatus according to claim 6, wherein a first movement pattern comprises movements in a first direction, and a second movement pattern comprises movements in a second direction.

8. The mobile communication apparatus according to claim 1, wherein a first movement pattern comprises repeated movements, and a second movement pattern comprises a single movement.

9. A method comprising:
   determining a movement pattern of a mobile communication apparatus;
   adapting a display of the mobile communication apparatus to provide a plurality of viewing modes, each of said modes associated with a movement pattern;
   selecting a viewing mode depending on said determined movement pattern;
   presenting said information on said display in accordance with said viewing mode and
   further wherein a first viewing mode for displaying items comprises displaying said items larger, and a second viewing mode for displaying items comprises displaying said items smaller, said first viewing mode being associated with a movement pattern comprising a higher level of movement, and said second mode being associated with a lower level of movement.

10. The method according to claim 9, wherein a first movement pattern comprises movements in a first direction, and a second movement pattern comprises movements in a second direction.

11. The method according to claim 9, wherein a first movement pattern comprises repeated movements, and a second movement pattern comprises a single movement.

* * * * *